United States Patent [19]

Wiley et al.

[11] 4,140,461
[45] Feb. 20, 1979

[54] FLOW MOLDING SURFACE OF PLASTIC AND CONDUCTIVE PARTICLES

[75] Inventors: Paul J. Wiley, Lexington; Robert Davis, Concord, both of Mass.

[73] Assignee: Allied Resin Corporation, East Weymouth, Mass.

[21] Appl. No.: 826,179

[22] Filed: Aug. 19, 1977

Related U.S. Application Data

[60] Continuation of Ser. No. 636,053, Nov. 28, 1975, abandoned, which is a division of Ser. No. 407,716, Oct. 31, 1973, Pat. No. 3,937,774, which is a continuation-in-part of Ser. No. 308,830, Nov. 22, 1972, abandoned.

[51] Int. Cl.² .............................................. B29C 23/00
[52] U.S. Cl. ................................. 425/174.6; 425/470
[58] Field of Search ............ 425/DIG. 30, 174, 174.2, 425/174.6, 470

[56] References Cited

U.S. PATENT DOCUMENTS

| 3,791,906 | 2/1974 | Farkas | 264/26 X |
| 3,832,111 | 8/1974 | Dunlap et al. | 425/174.2 |

FOREIGN PATENT DOCUMENTS 1319919  6/1973  United Kingdom.

*Primary Examiner*—Richard B. Lazarus
*Attorney, Agent, or Firm*—Wolf, Greenfield & Sacks

[57] ABSTRACT

Thermosetting molds are formed with electrically conductive surfaces for use in high frequency energy flow molding of sheet materials. Preferably the mold of this invention has a highly electrically conductive layer preferably in an epoxy gel coat carrying electrically conductive particles of gold, silver or platinum and positioned over a compatible epoxy mold body. A vacuum molding technique is used to obtain good surface definition in surface molding.

7 Claims, 8 Drawing Figures

FLOW MOLDING SURFACE OF PLASTIC AND CONDUCTIVE PARTICLES

RELATED APPLICATIONS

This application is a continuation of applicants' copending application Ser. No. 636,053 filed Nov. 28, 1975, now abandoned, which is a division of application Ser. No. 407,716 filed Oct. 31, 1973 now issued as U.S. Pat. No. 3,937,774 dated Feb. 10, 1976, which is a continuation-in-part of application Ser. No. 308,830 filed Nov. 22, 1972, now abandoned.

BACKGROUND OF THE INVENTION

Flow molding with the use of high frequency energy such as radio frequency energy has come into widespread use in recent times particularly in the surface molding of shoe uppers. As well-known, in such procedures, a negative RTV silicone rubber mold is produced, positioned on a ground electrode and a sheet stock such as vinyl sheet stock to be surfaced is laid over the mold with a top electrode pressed thereon and radio frequency energy flowed through the mold to thermally soften the vinyl and allow it to take on the surface characteristics of the negative mold.

The molds used are frequently made from RTV silicone rubber in known flow mold making procedures. However, such RTV silicone rubber mold masters have limited life spans in high frequency flow molding. The RTV silicone rubber molds act to absorb heat causing increased dwell times in the mold and in some cases, absorb plasticizers and secondary plasticizers of the vinyl thereby causing weakening, swelling and dimensional change of the silicone rubber molds. The definition of the surface configuration to be transferred is sometimes lost after few molding operations. The silicone rubber in some cases tears or permanently distorts. These defects in the silicone rubber molds used in flow-molding flow molding well-known.

It has been suggested that more durable molds be formed. For example, epoxy molds have been suggested. However, it is found that when such epoxy molds are used in radio frequency flow molding, the epoxy tends to absorb heat at a rate 3 to 8 times greater than absorbed by silicone rubber thereby lengthening dwell times in the mold to an unacceptable degree. Moreover, detail of the surface configuration to be transferred is sometimes lost. The removal of heat by the epoxy is such that in some cases the vinyl sheet being molded never reaches a molten state to allow detail to be transferred.

Probably because of the foregoing problems, the art has in most cases continued to use RTV silicone mold masters in high frequency flow molding procedures.

SUMMARY OF THE INVENTION

It is an object of this invention to provide a long life thermosetting mold for use in high frequency flow molding which mold does not absorb heat of molding in an amount to destroy or seriously affect the molding operation.

Another object of this invention is to provide a thermosetting plastic mold in accordance with the preceding object which has an electrically conductive molding surface.

It is still another object of this invention to provide a thermosetting plastic mold in accordance with the preceding objects which is resistant to adverse interaction with sheets being molded, retains transfer of definition for long time periods, is non-self-destructive under normal operation pressures and temperatures and has many of the advantageous characteristics of a metal mold including long life and high definition.

Still another object of this invention is to provide a method of flow molding incorporating the molds of this invention.

Still another object of this invention is to provide an improved vacuum assist step for use in obtaining good surface definition in flow molding.

According to the invention, a thermosetting plastic production mold is formed with an electrically conductive molding surface layer. Preferably the mold is formed with a surface layer of conductive particle filled resin, although in some cases the entire body of the mold can be conductive.

In a preferred method a vacuum is created between a sheet to be surface flow molded and the forming mold to enhance surface definition of the so molded sheet.

The electrically conductive surface layer is suitable for grounding in an RF flow molding machine. When used in this manner, no deleterious heat buildup occurs in the thermosetting plastic mold. High surface definition can be obtained in sheet materials molded over long time periods without cracking or shattering of the mold. Because of the high thermal conductivity as well as electrical conductivity of the surface layer, short molding cooling cycles and shorter dwell times than customarily used are obtained. Because the mold is rigid rather than flexible as with previous silicone rubber master molds, better detail such as detail of thread twist, needle perforation and the like is easily obtained. The conductive surface is preferably, continuous, liquid impervious and non-porous thus allowing for good surface definition in molding. The molds are rigid at temperatures and pressures used in conventional flow molding.

BRIEF DESCRIPTION OF THE DRAWINGS

The above and other features, advantages and objects of the present invention will be better understood from the following specification when read in conjunction with the accompanying drawings in which.

DESCRIPTION OF PREFERRED EMBODIMENTS

The high frequency flow molding conditions and apparatus used are as well-known in the art. For example, high frequency molding can be carried out at the following conditions:

| | |
|---|---|
| pressure (lbs/sq.in.on sheet molded) | 0.5 to 1000 lbs./sq.in. |
| dwell time | 1–20 seconds |
| temperature | 70° F–400° F |
| frequency | 20–54 megacycles |
| Wattage | 7.0 to 70 kilowatts |
| cooling time under pressure | |

| after dwell time under electrical energy | 1 to 60 seconds |
|---|---|

In such molding as known, a sheet material such as a vinyl sheet for example having a thickness of from 0.001 inch to 0.200 inch is placed over a production mold which is in turn placed on a ground electrode and a top electrode brought into contact with the vinyl sheet to press it against the production mold while the high frequency energy is passed therethrough. Slight flow molding occurs causing the sheet material to take on the surface contour and definition of the production mold. For example, as known in the shoe art, surface textures including stitching, perforations and the like can be imparted to a vinyl sheet during such flow molding. The surface contour and texture of a variety of shoe upper materials including stitched and embossed leather can be simulated. In some cases, the sheet to be molded need not be vinyl but other heat softening plastics and even surface treated leather can be surface flow molded by standard procedures.

The particular production mold used in flow molding is an important feature of the present invention. It has now been found that by using a thermosetting rigid plastic production mold having an electrically conductive surface, long life, high definition molds can be rapidly and inexpensively made for use in flow molding.

Figure 1:
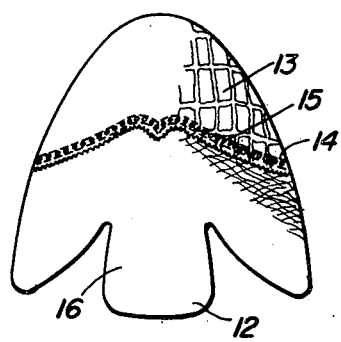
FIG. 1 is a top plan view of a shoe upper having surface detail and used to produce a production mold in accordance with this invention.

In an example of making a negative thermosetting plastic negative production mold of this invention, a conventional three-step process is used with the third step incorporating the conductive layer of this invention. In a first stage, a conventional flow molding mold box as diagrammatically shown at 10 in FIG. 2 has a rectangular frame 11 thereover with a pattern or master 12 positioned therein. The pattern 12 as best shown in FIG. 1, can be a leather-shoe upper having an embossed toe portion 13 with a line of stitching 14 therein and a series of perforations 15 with a leather grain 16 thereover. The object is to produce a mold which will reproduce the embossed, perforated and surface definition of the shoe master 12. The first stage is carried out by bonding the master 12 to a flat planar lower surface of the mold box as by the use of a double surface sticky tape which is compatible with the resins later used and which may be Minnesota Mining and Manufacturing Company two-way tape No. 419. A mold release agent containing an isopropyl-alcohol-water solution of polyvinyl alcohol is then brushed or sprayed onto all surfaces and allowed to dry for 30 minutes. Uncoated vinyl masters do not require the mold release. Four parts of Acron epoxy T4051A are then mixed with 1 part Arcon T4051B by weight and degassed in a vacuum chamber having about 4 times the volume of the epoxy in accordance with known procedures. Arcon epoxy T4051A is a product of Allied Resin Corporation of East Weymouth, Mass. formed of a bisphenol A/epichlorohydrin epoxy resin filled with 50% by weight $CaCO_3$ of a particle size ranging from 0.1 to 25 microns with an apparent epoxy equivalent weight of 360 ± 10. Arcon epoxy T4051B is a product of Allied Resin Corporation of East Weymouth, Mass. formed of polyoxypropyleneamine having an average molecular weight of 340 ± 50.

The epoxy mixture is then poured slowly over the master 12 and cured for 24 to 36 hours at room temperature to produce a negative first stage epoxy mold 20. Curing can be carried out at 110° F for 12 hours if desired.

Figure 2:
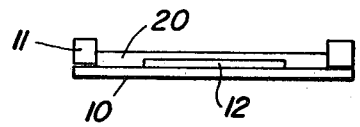
FIGS. 2-5 are semidiagrammatic illustrations of steps in the method of producing the thermosetting plastic mold of this invention.
Figure 3:
Figure 4:
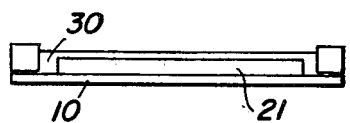

As illustrated in FIG. 3, using the first stage mold 20, the general procedure illustrated in FIG. 2 is repeated in a second stage. In this second stage, the first stage epoxy mold is bonded to the mold box 10 with a two-surface stick tape. Ten parts by weight of a silicone rubber RTV 664A, a trademarked product of General Electric Co. of Waterford, N.Y., containing a high strength methyl silane, addition curing, room temperature vulcanizing silicone rubber is mixed with 1 part by weight RTV 664B, a trademarked product of General Electric Co. of Waterford, N.Y. and containing a low molecular weight silicone rubber curing agent. The mixture is degassed in an area approximately 5 times the volume of the mixture after which the mixture is poured into the mold box and cured for 24 hours at room temperature or until tack free. The resulting silicone rubber positive second stage mold 21 is then thus formed and may be postcured for 2 to 3 hours at 300° F or until all surfaces are tack free. This results in a positive RTV silicone rubber mold 21, which is useful for forming the electrically conductive production mold of this invention.

In a third stage, a production mold of this invention is formed. Three parts by weight of T4083A, a product of Allied Resin Corporation of East Weymouth, Mass., formed of 24% by weight of bisphenol A/epichlorohydrin epoxy resin (molecular weight 360 ± 10) filled with 76% by weight of silver flake of a particle size ranging from 2 to 25 microns with an apparent epoxy equivalent weight of 700 ± 50 are mixed with 1 part by weight T4083B curing agent, a product of Allied Resin Corporation of East Weymouth, Mass., formed of methylethyl ketone solvent solution of two isomers 2,2,4 and 2,4,4 trimethylhexamethylenediamine and N-2 hydroxypropylimidizol as follows:

2.79% by weight: 2,2,4 trimethylhexamethylenediamine
2.79% by weight: 2,4,4 trimethylhexamethylenediamine
1.72% by weight: N-2 hydroxypropylimidizol
92.7% by weight: methylethyl ketone The mixture is then sprayed onto the silicone rubber mold 21 in a mold box 10 using a Paache #3 air brush to develop a film thickness of 0.010 inch. The mold box 10 is then heated at 140° F for 2 hours in an air circulating oven. This forms a gel coat of an epoxy over the silicone rubber positive mold 21. 100 parts of Arcon epoxy T4046A, a product of Allied Resin Corporation of East Weymouth, Mass., formed of an admixture of:

26.7% by weight bisphenol A/epichlorohydrin epoxy resin molecular weight of 360 ± 10
5.4% by weight milled glass fibers (1/32 wide screen size)
14.6% by weight $Al_2O_3$ particle size 1 to 8 microns
53.3% by weight Iron powder particle size 5–125 microns.

The above admixture, having an apparent epoxy equivalent weight of 675 ± 10, is mixed together with 3 parts by weight Arcon T4046B formed of:

38.3% by weight 2,2,4 trimethylhexamethylenediamine
38.3% by weight 2,4,4 trimethylhexamethylenediamine
23.4% by weight N-2 hydroxypropylimidizol The mixture is degassed in a mixing container having a volume approximately 5 times the volume of the mixture. The mixture is then slowly poured into the mold over the gel coating and cured for 2 hours at 200° F and then 3 hours at 350° F. The completed third stage negative production mold is then cooled to room temperature and demolded slowly. Additional gel coating formed of T4083A and T4083B in the proportions previously described are sprayed onto the sides and bottom of the mold so that all exterior surfaces have a volume resistivity of $1 \times 10^{-3}$ ohms-cm with minimum film thickness of 0.005 inch. This additional coating is heated to 140° F for 2 hours and post-cured for 2 hours at 350° F.

The resultant production mold has a surface coating which is uniformly electrically conductive and which is eminently suitable for use in high frequency flow molding.

Figure 5:
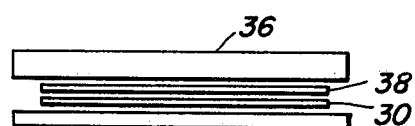
Figure 6:
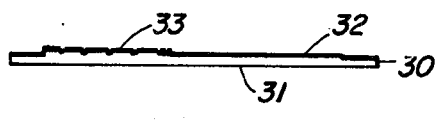
FIG. 6 is a side cross sectional view through a thermosetting plastic mold in accordance with this invention.
Figure 7:
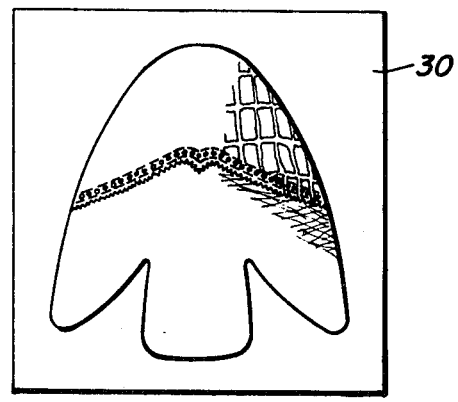
FIG. 7 is a top plan view thereof.

The resultant third stage mold 30 (FIGS. 6 and 7) has a rigid body 31 with an electrically conductive surface 32 preferably extending completely therearound and with a negative surface configuration 33 conforming to the surface configuration of the original 12. When placed in a high frequency flow molding apparatus diagrammatically illustrated in FIG. 5 between a planar surfaced top electrode 36 and a bottom planar surfaced electrode 37 along with a vinyl sheet 38 to be molded, the surface configuration can easily be produced in the vinyl sheet at conventional pressures and frequency ranges. In fact, somewhat lower amounts of electrical energy are necessary. For example, a flow molding machine can be used for molding vinyl sheets having a thickness of 0.068 inch in the form of a vamp pattern having a surface area of 100 sq. inches. The mold 30 is used and the machine operated at a pressure of 3 psi, dwell time of 7 seconds, room temperature, frequency 48 megacycles, wattage 15 kilowatts drawing 1500 volts R.F. and cooling time under pressure 10 secones. Good surface texture is produced on a surface of the vamp. The mold 30 has a long life span with relatively inexpensive cost as compared with metal molds. The mold does not absorb heat because of its surface coating which is heat conductive as well as electrically conductive causing substantially all the heat to be absorbed in the vinyl resulting in short dwell times. Moreover, the surface coating of the epoxy prevents absorbing of dioctyl phthalate and secondary plasticizers from the vinyl. Shorter cooling cycles in the mold are possible because of the high thermal conductivity. The rigidity and wear resistance of the molds are excellent giving high surface definition and extremely good detail in the surface coating formed.

The epoxy mold of this invention essentially has all the characteristics of a metal mold without the high cost of producing a metal mold.

In an alternate form of the method of this invention, in some cases even better surface definition can be obtained in flow molding by removing gases from the area between the sheet to be molded and the mold during the molding operation. This can be easily carried out by evacuating the area between the platens after first forming a gas seal therebetween. Removal of air along with water vapor from the molding area enables more uniform control by the molding operation, removes ionizable gases and water vapor which could cause problems and prevents gas pocketing to allow free flow of material without resistance into deep cavities in the mold surface.

Figure 8:
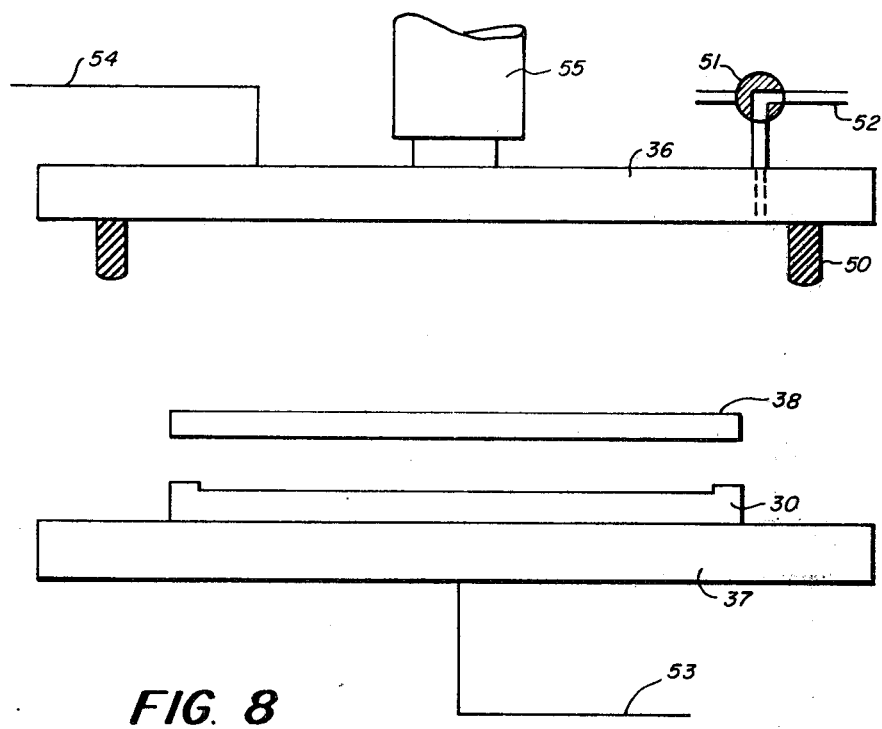
FIG. 8 is a semidiagrammatic showing of an improvement in conventional flow molding methods.

FIG. 8 illustrates the use of vacuum and removal of gases during flow molding. In this figure, the mold 30 previously described is positioned between platens 36 and 37 as previously described with a vinyl sheet 38 interposed. The molding arrangement includes an encircling resilient gasket 50 attached to preferably the upper platen 36 and a solenoid flip valve 51 connecting a vacuum line 52 to the mold area. High frequency transmission lines 53 and 54 are attached to the platens as known in the art and a conventional hydraulic press 55 is used. Using the conditions of the above-noted example, the vinyl sheet 38 is positioned in the mold area with the mold attached to the lower platen 37. The platens are then partially closed to form a hermetic seal about the mold and vinyl sheet due to the contact of the encircling gasket 50 with both platens. The vacuum line 52 is then opened to create a vacuum in the molding area. Power is applied and molding carried out using conventional procedure after which the mold is allowed to cool. The solenoid flip valve is then opened to allow air to reenter the molding area whereby the chamber can be easily opened.

It should be understood that the creation of a vacuum which removes gases including water vapor from the molding area is useful in high frequency flow molding even where the electrically conductive molds of this invention are not used. Thus, the vacuum step has advantages even where metal or other molds in place of mold 30 are used. While it is preferred to obtain a high vacuum in the molding area during molding, any vacuum provides some advantages. Preferably a vacuum of 29" of mercury is used. The vacuum can be applied only to the area between the sheet to be molded and the surface textured area of the mold if desired rather than to the entire mold area. However, application of the vacuum to the entire mold area between the platens and surrounding the sheet is preferred.

While specific examples of this invention have been shown and described, it should be understood that many variations are possible. The plastic thermosetting mold need not be formed of an epoxy material and in some cases other thermosetting materials which have heat distortion rates above 250° F can be used. Such materials include other epoxys, polyesters, phenolics, silicones and combinations of these and the like. The specific fillers used to provide electrical conductivity can vary with silver, gold or platinum particles being preferred because the oxides thereof are highly electrically conductive while other metal oxides are non-conductive. The fillers can be in conventional finely divided particle forms such as powder, flakes, spheres or irregular shapes. In some cases, the particles can be formed with cores of non-conductive or conductive materials and carry desired outer coatings of metals such as silver, gold or platinum in order to reduce cost while maintaining desired properties. For example, known silver coated copper particles are suitable for use in the molds of this invention. Preferably the electrically conductive surface layer of the mold has a thickness of at least 0.001 inch. The thickness can vary greatly depending on the frequency of R.F. energy used in the molding operation. Preferably the surface layer and mold body are of the same general family of plastics such as in the example given; however, different plastic materials can be used for each so long as they are compatible and evidence the desired characteristics of this invention.

In all cases it is preferred that the highly conductive surface layer of the mold have a volume resistivity no higher than $1 \times 10^{-1}$ ohms-cm at 20° C and more preferably be in the range of from $1 \times 10^{-3}$ to $1 \times 10^{-5}$ ohms-cm at 20° C. Preferably the conductive layer has a thickness of from 0.003 to 0.1 inch. The conductivity should be sufficient to avoid RF energy absorption and heat buildup in the mold. In some cases, the entire mold can be electrically conductive although surface layers as described are sufficient to achieve the results desired. Preferably, the molds have hardness values of at least 45 Shore D with minimum coating thicknesses of at least 25 microns.

In some cases, the entire mold can be electrically conductive although this does not significantly increase the advantageous properties of the mold. When the entire mold is electrically conductive, it is formed integrally of a thermosetting plastic material as described above. Thus epoxys, polyesters, phenolics, silicones and the like used for either the coating layer or base of the mold such as 30 is used for the entire mold body and has uniformly incorporated therein the conductive fillers of this invention as previously described. For example, a uniformly electrically conductive mold throughout can be formed using a silicone rubber positive mold such as 21, by pouring into the mold 21 a mixture comprising 100 parts of Arcon epoxy T4046A and three parts by weight Arcon T4046B having uniformly incorporated therein 76% by weight of silver flakes of a particle size ranging from 2 to 25 microns. The molding material is mixed together and molded as previously described in the above example and a fully uniformly electrically conductive mold identical to mold 30 is formed except that the entire mold is electrically conductive. In this case, the entire mold has the uniform electrically conductive properties of the surface layer of mold 30.

While sheet molding has been described for use on shoe uppers, sheet molding of various types can be carried out with high frequency energy for various uses including producing of surface effects for handbags, shoes, clothing, automotive dashboards, place mats and other uses.

We claim:

1. A rigid thermosetting plastic mold for use in high frequency flow molding of sheet materials,
    said mold comprising a body having a mold outer surface,
    said mold outer surface carrying means for transferring a surface texture to a sheet to be molded,
    said mold body carrying an electrically conductive plastic layer formed by a plurality of finely divided, uniformly dispersed metal surfaced particles so that said layer has a volume resistivity in the range of from $1 \times 10^{-1}$ ohms-cm to $1 \times 10^{-5}$ ohms-cm at 20° C,
    said metal of said metal surfaced particles being selected from the group consisting of silver, gold and platinum.

2. A rigid thermosetting plastic mold in accordance with claim 1 and defining a mold base mounting said mold in an R.F. energy machine,
    said mold base having an electrically conductive path to said means formed by said electrically conductive layer.

3. A rigid thermosetting plastic mold in accordance with claim 2 wherein said electrically conductive path is formed by a metal particle filled resin layer integrally united with said body.

4. A rigid thermosetting plastic mold in accordance with claim 3 wherein said mold body is formed of an epoxy resin.

5. A rigid thermosetting plastic mold in accordance with claim 4 wherein said electrically conductive layer is formed of an epoxy resin filled with silver particles.

6. A rigid thermosetting plastic mold for use in high frequency flow molding of sheet materials in accordance with claim 1 wherein said mold body and electrically conductive layer are integrally formed of a single material having uniform electrically conductive properties throughout,
    said mold body having uniformly dispersed therein a plurality of metal surfaced particles with the metal selected from the group consisting of silver, gold and platinum, said particles being present in an amount sufficient to provide a volume resistivity in the range of from $1 \times 10^{-1}$ ohms-cm to $1 \times 10^{-5}$ ohms-cm at 20° C.

7. An R.F. energy molding machine for use in high frequency flow molding of sheet materials, said machine mounting a rigid thermosetting plastic mold,
    said mold comprising a body having a mold outer surface,
    said mold outer surface carrying means for transferring a surface texture to a sheet to be molded,
    said mold having its molding surface formed of an electrically conductive plastic layer formed by a plurality of finely divided, uniformly dispersed metal surfaced particles so that said layer has a volume resistivity in the range of from $1 \times 10^{-1}$ ohms-cm to $1 \times 10^{-5}$ ohms-cm at 20° C,
    said metal of said metal surfaced particles being selected from the group consisting of silver, gold and platinum.

* * * * *

UNITED STATES PATENT OFFICE
CERTIFICATE OF CORRECTION

Patent No. 4,140,461　　　　　　Dated February 20, 1979

Inventor(s) Paul J. Wiley and Robert Davis

It is certified that error appears in the above-identified patent and that said Letters Patent are hereby corrected as shown below:

Column 1, line 39, delete "flow molding" and insert --are--.

Column 5, line 61, delete "by" and insert --of--.

Signed and Sealed this

Eighth Day of January 1980

[SEAL]

Attest:

SIDNEY A. DIAMOND

*Attesting Officer*　　　*Commissioner of Patents and Trademarks*